(12) United States Patent
Katsoulakos et al.

(10) Patent No.: US 11,631,052 B2
(45) Date of Patent: Apr. 18, 2023

(54) AD HOC SUPPLY CHAIN COMMUNITY NODE

(71) Applicant: CLMS UK LIMITED, Herts (GB)

(72) Inventors: Panayotis Katsoulakos, W Sussex (GB); Ioannis Zorgios, South Croydon (GB); Ioanna Fergadiotou, Athens (GR); Patrick J. O'Sullivan, Dublin (IE); Vassileios Karakostas, Macclesfield (GB); Antonios Mygiakis, Chalandri (GR)

(73) Assignee: CLMS UK LIMITED, New Barnet Herts (GB)

( * ) Notice: Subject to any disclaimer, the term of this patent is extended or adjusted under 35 U.S.C. 154(b) by 1026 days.

(21) Appl. No.: 15/941,115

(22) Filed: Mar. 30, 2018

(65) Prior Publication Data

US 2019/0303871 A1    Oct. 3, 2019

(51) Int. Cl.
*G06Q 10/06*    (2012.01)
*G06Q 10/10*    (2012.01)
(Continued)

(52) U.S. Cl.
CPC ..... *G06Q 10/103* (2013.01); *G06Q 10/06315* (2013.01); *G06Q 10/06393* (2013.01)

(58) Field of Classification Search
CPC ........... G06Q 10/103; G06Q 10/06393; G06Q 10/06315
See application file for complete search history.

(56) References Cited

U.S. PATENT DOCUMENTS

| | | | |
|---|---|---|---|
| 6,091,724 A * | 7/2000 | Chandra | H04L 12/1854 370/256 |
| 7,039,562 B1 * | 5/2006 | Notani | G06Q 10/06 703/1 |

(Continued)

OTHER PUBLICATIONS

Xu, A. Nieto, B. R. Ferrer, R. Camp and J. L. M. Lastra, "Cloud based solution enabling collaborative supply network optimization for an original equipment manufacturer," 2016 IEEE 14th International Conference on Industrial Informatics (INDIN), 2016, pp. 689-694, doi: 10.1109/INDIN.2016.7819248. (Year: 2016).*

(Continued)

*Primary Examiner* — Mehmet Yesildag
*Assistant Examiner* — Jeremy L Gunn
(74) *Attorney, Agent, or Firm* — CRGO Global; Steven M. Greenberg

(57) ABSTRACT

An ad hoc supply chain collaborative computing environment management method includes selecting a collaboration model from amongst several models and establishing the environment in accordance with the selected model including defining a knowledge graph, a set of expected events to be received in an event log, and one or more predictive functions operating upon the different events in the event log to produce predictive values. The method also includes, registering actors in a supply chain as authenticated publishers or subscribers to the event log of different events published by different authenticated computing systems of the actors, authenticating different ones of the registered different actors prior the different actors publishing events to the event log, triggering predictive functions for newly published ones of the events in order to produce predictive values and providing read-only access to different states of the entities of the knowledge graph to authenticated subscribers.

18 Claims, 2 Drawing Sheets

(51) Int. Cl.
*G06Q 10/0631* (2023.01)
*G06Q 10/0639* (2023.01)

(56) References Cited

U.S. PATENT DOCUMENTS

| | | | | |
|---|---|---|---|---|
| 7,409,356 | B1* | 8/2008 | Geddes | G06Q 10/06 705/7.25 |
| 10,943,072 | B1* | 3/2021 | Jaganmohan | G06N 3/08 |
| 2003/0149608 | A1* | 8/2003 | Kall | G06Q 10/063 705/7.27 |
| 2005/0071207 | A1* | 3/2005 | Clark | G06Q 10/06 705/7.38 |
| 2010/0325214 | A1* | 12/2010 | Gupta | G06Q 10/10 709/206 |
| 2014/0156724 | A1* | 6/2014 | Said | H04L 29/08 709/203 |
| 2014/0207486 | A1* | 7/2014 | Carty | G06Q 10/10 705/2 |
| 2017/0293975 | A1* | 10/2017 | Saito | G06Q 50/06 |
| 2018/0082183 | A1* | 3/2018 | Hertz | G06Q 10/10 |
| 2018/0218468 | A1* | 8/2018 | Dunne | G06N 20/00 |
| 2019/0171438 | A1* | 6/2019 | Franchitti | G06F 16/9538 |

OTHER PUBLICATIONS

F. Hauser, V. Pomponne, Z. Jiang, J. Lamothe and F. Benaben, "Processes orchestration for preventing and managing shortages in a supply chain a dermo-cosmetics use case," 2017 International Conference on Engineering, Technology and Innovation (Year: 2017).*

M. J. Islam, B. R. Ferrer, X. Xu, A. Nieto and J. L. M. Lastra, "Implementation of an industrial visualization model for collaborative networks," 2016 IEEE 14th International Conference on Industrial Informatics (INDIN), 2016, pp. 720-725 (Year: 2016).*

Ping, L et al. "Study on multi-agent-based agile supply chain management," Int J Adv Manuf Technol (2004) 23: 197-203; retrieved from https://link.springer.com/content/pdf/10.1007/s00170-003-1626-x.pdf (Year: 2004).*

* cited by examiner

AD HOC SUPPLY CHAIN COMMUNITY NODE

BACKGROUND OF THE INVENTION

Field of the Invention

The present invention relates to the field of logistics data sharing and visibility and more particularly to collaborative logistics data sharing and visibility in supply chain management.

Description of the Related Art

A supply chain is a network between a company and its suppliers to produce and distribute a specific product, and the supply chain represents the steps it takes to get the product or service to the customer. Supply chain management is a crucial process because an optimized supply chain results in lower costs and a faster production cycle. Business logistics management refers to the production and distribution process within the company, while supply chain management includes suppliers, manufacturers, logistics and transportation companies and retailers that distribute the product to the end customer. Supply chains include every business that comes in contact with a particular product, including companies that assemble and deliver parts to the manufacturer.

Because the traditional supply chain involves many different actors utilizing many different disparate information systems, information sharing amongst the different actors can be challenging. Transparency into the state of affairs of a given transaction depends largely upon the willingness and diligence of each actor in the supply chain of the transaction to provide accurate and timely information to one another. In a single transaction, so much seems not so daunting, but in a supply chain ecosystem of hundreds if not thousands of transactions are ongoing at any given time and much of the resources available within the ecosystem—particularly in respect to transportation and logistics—remain dependent upon the state of multiple different transactions.

In this regard, in any supply chain ecosystem, it is the unstated goal to optimize the utilization of all resources in the supply chain so as to most effectively and optimally bring products from source to sink. But, given the multiplicity of different actors in the supply chain and the disparity of information provided by each actor, optimization of the supply chain remains nearly impossible. To compound matters, supply chain participants vary in their willingness to share supply chain information deemed sensitive, confidential and therefore, not appropriate for public consumption.

BRIEF SUMMARY OF THE INVENTION

Embodiments of the present invention address deficiencies of the art in respect to supply chain information sharing and provide a novel and non-obvious method, system and computer program product for an ad hoc supply chain collaborative computing environment adapted for supply chain information sharing amongst actors in a supply chain so as to promote supply chain information sharing amongst participants in a supply chain in a private and confidential manner and therefore to promote supply chain resource utilization optimization. In an embodiment of the invention, an ad hoc supply chain collaborative computing environment includes a host computing system of one or more computers, each with memory and at least one processor and a data store coupled to the host computing system and adapted to persist data therein. The collaborative computing environment also includes a collaboration model stored in the memory and selected from amongst a multiplicity of collaboration models. Each of the collaboration models corresponds to a different set of data sharing requirements in a supply chain and acts as a template for an instance of an ad hoc supply chain collaborative computing environment.

In this regard, each of the collaboration models defines a specific type of knowledge graph that includes different entities representative of corresponding actors and resources of the supply chain necessary to fulfill data processing requirements of the different set, joined by edges representative of relationships between respectively joined ones of the entities. Each of the collaboration models also defines a set of events expected to be received in connection with the data sharing requirements. Finally, each of the collaboration models defines one or more predictive functions operating upon the set of events to produce predictive values.

The collaborative computing environment thus also includes a knowledge graph initialized in accordance with the selected collaboration model and persisted in the data store and that includes different entities representative of corresponding resources of a supply chain, joined by edges representative of relationships between respectively joined ones of the entities. Of note, an event log is persisted in the data store and includes different events published to the event log in accordance with the selected collaboration model by different authenticated computing systems of the actors.

Finally, the supply chain collaborative computing environment includes a supply chain collaborative computing environment module. The module includes program instructions executing in the memory of the host computing system in order to perform first registering different actors in the supply chain as authenticated publishers or subscribers to the event log and mapping events occurring in information systems of respective ones of the actors to the events of the selected collaboration model. The program instructions also authenticate different ones of the registered actors prior the different ones of the actors publishing events to the event log. The program instructions yet further trigger selected ones of the predictive functions for newly published ones of the events mapped to the selected ones of the predictive functions in order to produce the predictive values. Finally, the program instructions compute different states of the entities of the knowledge graph responsive to the predictive values produced by the predictive functions and provide read-only access to the different states of the entities of the knowledge graph to authenticated subscriber ones of the actors through an interface to the supply chain collaborative computing environment module.

In one aspect of the embodiment, the program instructions are further enabled to provide access to the different states of the entities of the knowledge graph by other supply chain collaborative computing environments in an aggregation of interoperable supply chain collaborative computing environments. In another aspect of the embodiment, the supply chain collaborative computing environment further includes a search engine interface configured to conduct search queries presented through the search engine interface against both the knowledge graph and also the event log. In yet another aspect of the embodiment, the supply chain collaborative computing environment includes a set of key performance indicators (KPIs) defined in the data store, with at least one of the predictive functions determining a change in one of the KPIs based at least one of the newly published ones of the events. In even yet another aspect of the embodiment, the supply chain collaborative computing environment includes one or more access rules disposed in the data store each rule defining a limitation on accessing state information for entities of the knowledge graph based upon an identity of a corresponding one of the actors seeking access to the state information.

Finally, in even yet another aspect of the embodiment, the collaboration models include at least one model directed to data sharing requirements for retail stock optimization. As well, the collaboration models include at least one model directed to data sharing requirements for transportation and logistics resource and capacity optimization. Even further, the collaboration models include at least one model directed to data sharing requirements for logistics pooling and integration for urban distribution. Even yet further, the collaboration models include at least one model directed to data sharing requirements for electronic compliance with governmental regulations. Finally, the collaboration models include at least one model directed to data sharing requirements for supply chain financial management.

In another embodiment, an ad hoc supply chain collaborative computing environment management method is provided. The method includes presenting in a user interface of a host computing system, a list of collaboration models, each corresponding to a different set of data sharing requirements in a supply chain and acting as a template for an instance of an ad hoc supply chain collaborative computing environment, each corresponding to a different set of data sharing requirements in a supply chain and acts as a template for an instance of an ad hoc supply chain collaborative computing environment. The method also includes selecting in the user interface, one of the collaborative models and in response to the selection, initializing in memory of the host computing system in accordance with the selected collaboration model, a knowledge graph comprising different entities representative of corresponding resources of the supply chain, joined by edges representative of relationships between respectively joined ones of the entities.

The method yet further includes registering by a processor of a host computing system different actors in a supply chain as authenticated publishers or subscribers to an event log persisted in a data store coupled to the host computing system and comprising different events published to the event log defined in accordance with the selected collaboration model and by different authenticated computing systems of the actors and mapping events occurring in information systems of respective ones of the actors to the events of the selected collaboration model. The method yet further includes authenticating by the processor different ones of the registered different actors prior the different actors publishing events to the event log. The method even yet further includes triggering by the processor selected ones of the predictive functions for newly published ones of the events mapped to the selected ones of the predictive functions in order to produce the predictive values. Finally, the method includes generating by the processor different states of the entities of the knowledge graph responsive to the predictive values produced by the predictive functions and providing by the processor read-only access to the different states of the entities of the knowledge graph to authenticated subscriber ones of the actors through an interface to the supply chain collaborative computing environment module.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an ad hoc supply chain collaborative computing node adapted for supply chain information sharing amongst actors in a supply chain so as to promote on demand supply chain information sharing amongst participants in a supply chain in a private and secure manner. In accordance with an embodiment of the invention, a participant in a supply chain configures a supply chain collaborative computing environment as a collaborative computing environment. The configuration process begins with the selection from a set of collaboration models, a particular collaboration model consistent with a type of the supply chain. The configuration proceeds with the initialization, in accordance with the particular collaboration model, of a knowledge graph of a multiplicity of entities representative of the prospective actors and resources in the supply chain connected by edges defining relationships therebetween.

The configuration further continues with the definition of a set of events expected to occur in the supply chain in accordance with the collaboration model. The configuration yet further continues with the registration of different publisher and subscriber ones of the actors to an event log and providing authentication credentials to each of the publisher and subscriber ones of the actors. Finally, the configuration completes with the specification, in accordance with the collaboration model, of one or more computational functions each computing a predictive supply chain value of the supply chain based upon events written onto the event log by publisher ones of the actors. In this way a supply chain collaborative computing environment may be provisioned by an actor in the supply chain in a templated way according to a specified collaboration model for the supply chain so as to permit the sharing of information of the supply chain amongst participants in the supply chain in a private and confidential manner so as to promote supply chain resource utilization optimization.

Figure 1:
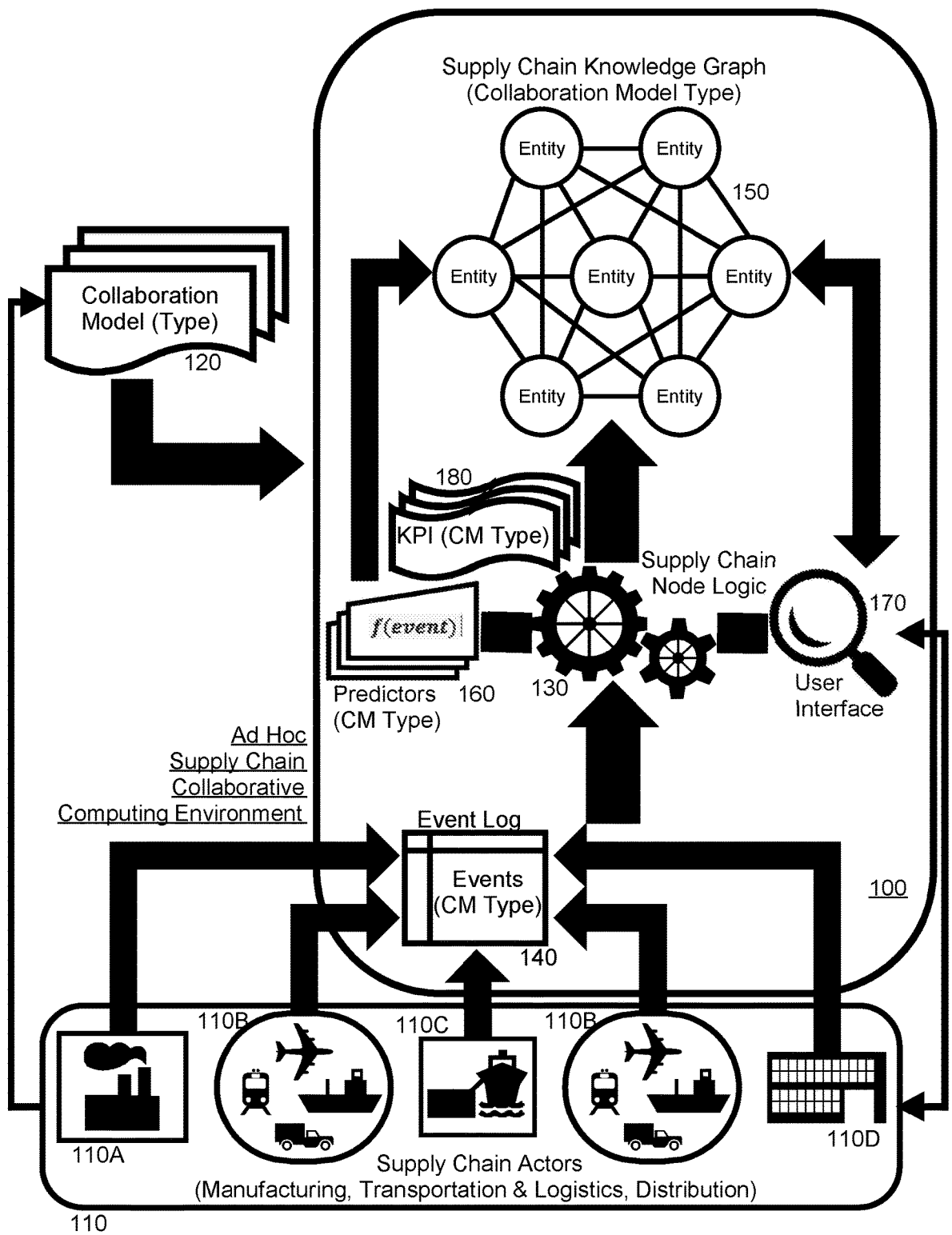
FIG. 1 is a pictorial illustration of a supply chain adapted for private information sharing utilizing a supply chain collaborative computing environment.

In further illustration, FIG. 1 pictorially illustrates a supply chain adapted for private information sharing utilizing a supply chain collaborative computing environment. As shown in FIG. 1, one or more individual actors 110 in a supply chain, ranging from a manufacturing source 110A, to a transportation and logistics provider 110B, to a port of entry 110C to a distribution center 110D, select a collaborative model from amongst a selection of collaborative models 120. Those collaboration models 120 may include a particular type, for instance by way of example, at least one model directed to data sharing requirements for a retail stock optimization, at least one model directed to data sharing requirements for transportation and logistics resource and capacity optimization, at least one model directed to data sharing requirements for logistics pooling and integration for urban distribution, at least one model directed to data sharing requirements for electronic compliance with governmental regulations, and at least one model directed to data sharing requirements for supply chain financial management.

Each of the collaboration models 120 defines a specific type of knowledge graph that includes different entities representative of corresponding actors and resources of the supply chain necessary to fulfill data sharing requirements of the different set, joined by edges representative of relationships between respectively joined ones of the entities. Each of the collaboration models 120 also defines a set of events expected to be received in connection with the data sharing requirements such that different ones of the actors 110 may adapt internal events to a format set forth for corresponding events of a selected one of the collaboration models 120. Finally, each of the collaboration models 120 defines one or more predictive functions operating upon the set of events to produce predictive values, and optionally, one or more KPIs 180 specific to a type of a selected one of the collaboration models 120.

Consequently, once one of the actors 110 selects a particular one of the collaboration models 120, an ad hoc supply chain collaborative computing environment 100 is established in which supply chain data is shared privately and securely amongst the actors 110. As part of the establishment of the ad hoc supply chain collaborative computing environment 100, supply chain collaborative computing environment logic 130 creates a knowledge graph 150 of different entities representative of the actors and resources of the supply chain, and edges connecting the entities to one another representative of the relationships between the entities, in accordance with the selected one of the collaboration models 120.

Supply chain collaborative computing environment logic 130 in the ad hoc supply chain collaborative computing environment 100 then registers each of the actors 110 as a publisher of events to an event log 140. As well, the supply chain collaborative computing environment logic 130 registers selected ones of the actors 110 as subscribers to updated states for the entities of the knowledge graph 150. Finally, the supply chain collaborative computing environment logic 130 maps events occurring in information systems of respective ones of the actors 110 to the events of the selected one of the collaboration models 120.

Once the ad hoc supply chain collaborative computing environment 100 has been established, the supply chain collaborative computing environment logic 130 continuously monitors the event log 140 in order to process new events published to the event log 140 by the registered ones of the actors 110 in accordance with events defined by the selected one of the collaboration models 120. As the supply chain collaborative computing environment logic 130 detects a new event published to the event log 140, the supply chain collaborative computing environment logic 130 identifies one or more entities in the knowledge graph 150 implicated by the new event. In turn, the supply chain collaborative computing environment logic 130 applies one or more predictive functions 160 defined by the selected one of the collaboration models 120 to one or more values specified by the new event and in connection with the implicated entities so as to produce one or more updated values in connection with the implicated entities and to post one or more additional events to the event log 140 encapsulating the updated values. As well, one or more of the KPIs 180 defined for the selected one of the collaboration models 120 may be compared to the updated values in order to produce a measurement of a difference therebetween. Consequently, subscribing ones of the actors 110 may query the event log 140 through interface 170 so as to enjoy real-time access to shared supply chain data affected by the events published to the event log 140.

Figure 2:
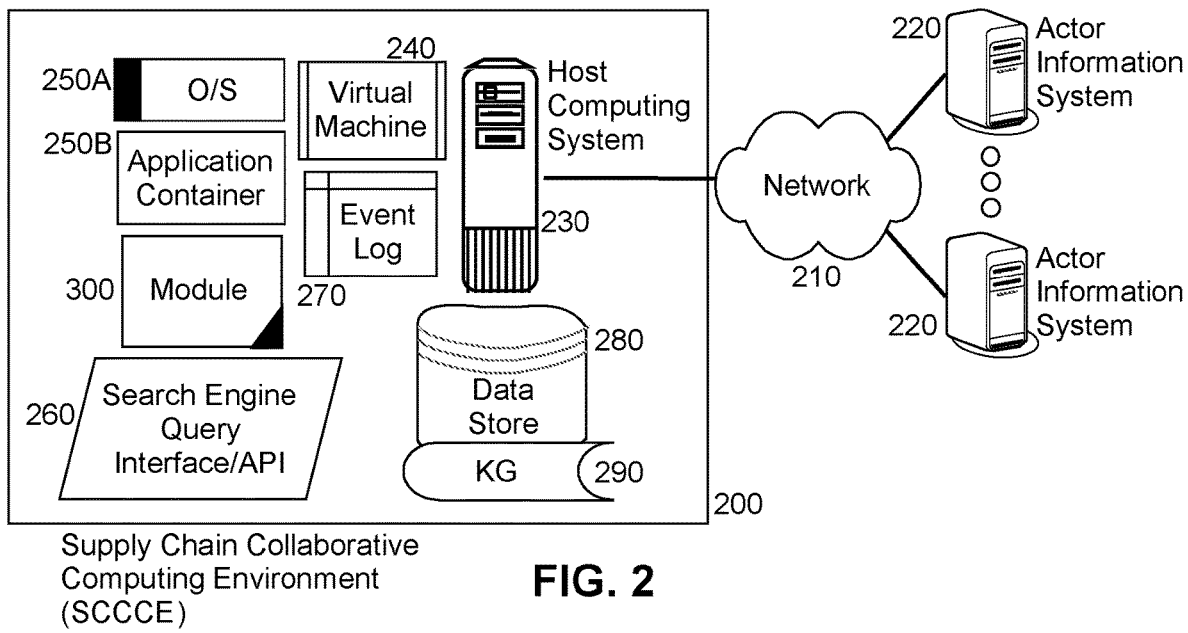
FIG. 2 is schematic illustration of the supply chain collaborative computing environment of FIG. 1.

In more specific illustration of the ad hoc supply chain collaborative computing environment 100, FIG. 2 is schematic illustration of an exemplary ad hoc supply chain collaborative computing environment 200. An ad hoc supply chain collaborative computing environment may be implemented in a host computing system 230 that includes one or more computers, each with memory and at least one processor. The host computing system 230 may be communicatively coupled over computer communications network to different information systems 220 for different actors in a supply chain so that information may be transmitted to the host computing system 230 by the different information systems 220, and information may be transmitted to the different information systems 220 by the host computing system 230.

A virtual machine 240 may execute in the memory of the host computing system 230 and support the operation therein of an operating system 250A. A data store 280 adapted to persist data is coupled to the host computing system 230 and stores therein a knowledge graph 290 defining both a multiplicity of entities, each entity corresponding to one of the different actors or resources of the supply chain, and also the relationships between the entities, all in accordance with a collaboration model selected from amongst a list of collaboration models in a user interface of the host computing system 230. Optionally, the data store 280 persists one or more contemporaneous values for corresponding KPIs of the supply chain defined by the selected collaboration model. Finally, an event log 270 is established in the memory of the host computing system 230 in which different events are posted as defined by the selected collaboration model.

The operating system 250A may support the presence of one or more application containers 250B. One of the application containers 250B hosts the execution of a supply chain collaborative computing environment module 300. The supply chain collaborative computing environment module 300 includes program instructions that when execute in the memory of the host computing system by way of the one of the application containers 250B, monitors the event log 270 to detect new events published to the event log 270 by different ones of the information systems 220. The program instructions further process each detected event by applying one or more predictive functions defined by the selected collaboration model, to data within the event and data of one or more implicated entities in the knowledge graph 290 so as to produce an updated state for one or more of the entities in the knowledge graph 290 and to publish an additional event to the event log 270 reflective of the updated state. Optionally, the program instructions compute for a given event a new value for one of the KPIs stored in the data store 280.

Notably, a query interface 260 is provided in the supply chain collaborative computing environment 200. The query interface 260 may be a form driven user interface or an API providing programmatic access to the knowledge graph 290. More particularly, the query interface 260 provides a user interface accessible over the computer communications network 210 into which different actors in the supply chain may be authenticated into the supply chain collaborative computing environment, through which queries against the knowledge graph 290 and also the event log 270 may be received and through which result sets from the queries may be presented. In this way, the different actors of the supply chain may access supply chain state information in a transparent and secure way.

Figure 3:
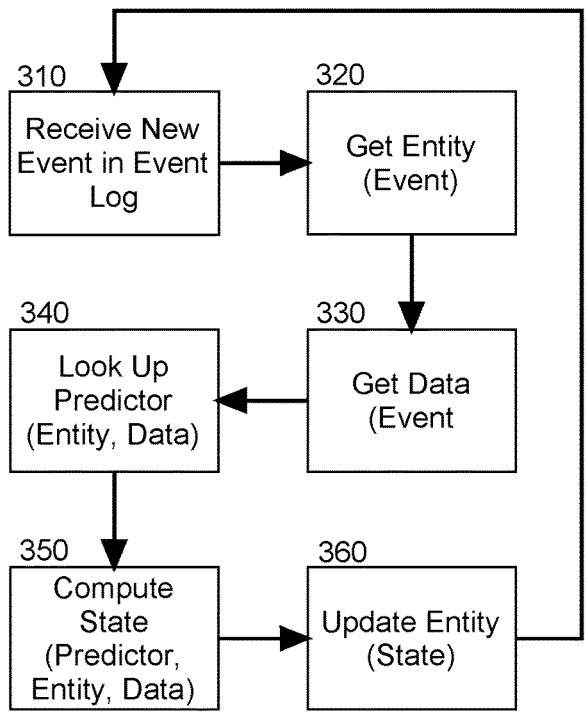
FIG. 3 is a flow chart illustrating a process for managing events in the supply chain collaborative computing environment of FIG. 2; and, FIG. 4 is a diagram depicting a shared logistical environment incorporating several different supply chain collaborative computing environments interoperating with one another to provide for private supply chain information sharing across different supply chains.

In even yet further illustration of the operation of the supply chain collaborative computing environment module 300, FIG. 3 is a flow chart illustrating a process for managing events in the supply chain collaborative computing environment of FIG. 2. Beginning in block 310, a new event for the supply chain is received in the event log as having been published by a registered publishing actor of the supply chain. In block 320, an entity in the knowledge graph for the supply chain may be identified as having been implicated by the event. For instance, data encapsulated in the event may be parsed to identify one or more entities also present in the knowledge graph. Likewise, in block 330, supply chain data associated with the event may be extracted from the event.

In block 340, a predictor is determined as being relevant to the identified entity or entities and the extracted data. Thereafter, in block 350 a new state for the identified entity or entities may be computed by applying the predictor as a function of pertinent data of the identified entity or entities and the extracted data. As such, in block 360 a state of the entity or entities is updated to the new state and the new state is then encapsulated into an additional even and posted onto the event log. Optionally, a new value for each of one or more KPIs may be computed and stored in the supply chain collaborative computing environment. Finally, the process repeats in block 310 with the receipt of a new event in the event log.

Figure 4:
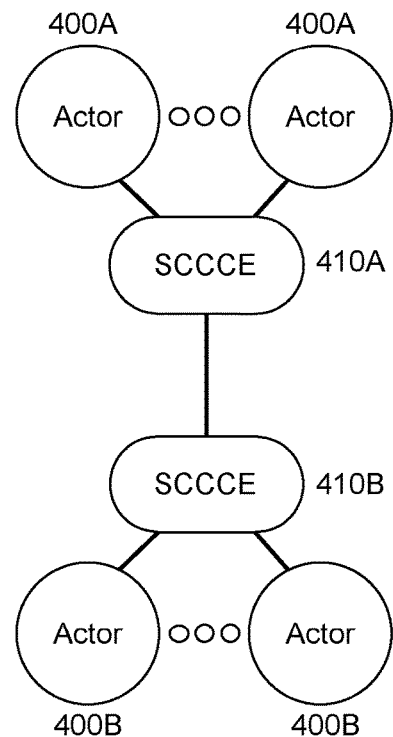

Of import, while it will be apparent that a single ad hoc supply chain collaborative computing environment supports the transparent and secure sharing of supply chain information amongst the participants in a specific supply chain, the supply chain of FIG. 2 may be adapted to register other supply chain collaborative computing environments as both publishers of events to the event log, and also as subscribers to state information of the knowledge graph of FIG. 2. Indeed, different supply chain collaborative computing environments may bi-directionally register one another so as to effectively integrate the contemporaneous processing of events occurring in two different corresponding supply chains. The foregoing is simply illustrated in FIG. 4 in which a shared logistical environment is shown incorporating several different supply chain collaborative computing environments 410A, 410B interoperating with one another to provide for private supply chain information to respectively different supply chain actors 400A, 400B sharing across different supply chains.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An ad hoc supply chain collaborative computing environment for use in a supply chain and adapted for private information sharing, a node comprising:
   a host computing system comprising one or more computers, each with memory and at least one processor;
   a data store coupled to the host computing system and adapted to persist data therein;
   a collaboration model loaded in the memory and selected from amongst a multiplicity of collaboration models, each one of the multiplicity of collaboration models corresponding to a different set of data processing requirements in a supply chain and acting as a template for an instance of an ad hoc supply chain collaborative computing environment, each one of the multiplicity of collaboration models defining:
   a specific type of knowledge graph comprising different entities representative of corresponding actors and resources of the supply chain necessary to fulfill data processing requirements of the different set, joined by edges representative of relationships between respectively joined ones of the entities, and
   a set of events expected to be received in connection with the data sharing requirements;
   an initialized instance of a knowledge graph that has been initialized in accordance with the selected collaboration model and persisted in the data store, with corresponding one or more entities which have been updated in response to an applied one of the events;
   an event log persisted in the data store, the event log comprising different events published to the event log in accordance with the selected collaboration model by different authenticated computing systems of the actors; and
   a supply chain collaborative computing environment module comprising program instructions executing in the memory of the host computing system in order to perform:
   registering different ones of the actors as authenticated publishers or subscribers to the event log and mapping events occurring in information systems of respective ones of the actors to the events of the selected collaboration model,
   authenticating different ones of the registered different ones of the actors prior the different ones of the actors publishing events to the event log,
   triggering functions for newly published ones of the events which have been mapped to the functions, the functions each operating upon data stored in the entities and data stored in the published ones of the events so as to perform an updating of different states of the entities of the knowledge graph, and
   providing read-only access to the different states of the entities of the knowledge graph to authenticated subscriber ones of the actors through an interface to the supply chain collaborative computing environment module.

2. The ad hoc supply chain collaborative computing environment of claim 1, wherein the program instructions are further enabled to transmit the different states of the entities of the knowledge graph to other supply chain collaborative computing environments in an aggregation of interoperable supply chain collaborative computing environments.

3. The ad hoc supply chain collaborative computing environment of claim 1, wherein the node further comprises a search engine interface configured to conduct search queries presented through the search engine interface against the knowledge graph.

4. The ad hoc supply chain collaborative computing environment of claim 1, further comprising a set of key performance indicators (KPIs) defined in the data store, wherein at least one of the functions determines a change in one of the KPIs based at least one of the newly published ones of the events.

5. The ad hoc supply chain collaborative computing environment of claim 1, further comprising one or more access rules disposed in the data store each rule defining a limitation on accessing state information for the knowledge graph based upon an identity of a corresponding one of the actors seeking access to the knowledge graph.

6. The ad hoc collaborative computing environment of claim 1, wherein the collaboration models include at least one model directed to data sharing requirements for a retail stock optimization, at least one model directed to data sharing requirements for transportation and logistics resource and capacity optimization, at least one model directed to data sharing requirements for logistics pooling and integration for urban distribution, at least one model directed to data sharing requirements for electronic compliance with governmental regulations, and at least one model directed to data sharing requirements for supply chain financial management.

7. An ad hoc supply chain collaborative computing method, the method comprising:
  presenting in a user interface of a host computing system, a list of collaboration models, each corresponding to a different set of data sharing requirements in a supply chain and acting as a template for an instance of an ad hoc supply chain collaborative computing environment, each of the collaboration models defining:
   a specific type of knowledge graph comprising different entities representative of corresponding actors and resources of the supply chain necessary to fulfill data processing requirements of the different set, joined by edges representative of relationships between respectively joined ones of the entities,
   a set of events expected to be received in connection with the data sharing requirements, and
   an initialized instance of a knowledge graph that has been initialized in accordance with the selected collaboration model and persisted in a data store, with corresponding one or more entities which have been updated in response to an applied set of events;
  selecting in the user interface, one of the collaborative models and in response to the selection, initializing in memory of the host computing system in accordance with the selected collaboration model, a knowledge graph comprising different entities representative of corresponding resources of the supply chain, joined by edges representative of relationships between respectively joined ones of the entities;
  registering by a processor of the host computing system different actors in a supply chain as authenticated publishers or subscribers to an event log persisted in the data store coupled to the host computing system and comprising different events defined in accordance with the selected collaboration model and published to the event log by different authenticated computing systems of the actors and mapping events occurring in information systems of respective ones of the actors to the events of the selected collaboration model;
  authenticating by the processor different ones of the registered different actors prior the different actors publishing events to the event log;
  modifying by the processor different states of the entities of the knowledge graph responsive to a set of newly published ones of the events which have been mapped to functions, each of the functions operating upon data stored in the entities and data stored in the published ones of the events so as to perform an updating of different states of the entities of the knowledge graph; and
  providing by the processor read-only access to the different states of the entities of the knowledge graph to authenticated subscriber ones of the actors through an interface to a supply chain collaborative computing environment module.

8. The method of claim 7, further comprising transmitting by the processor the different states of the entities of the knowledge graph to other supply chain collaborative computing environments in an aggregation of interoperable supply chain collaborative computing environments.

9. The method of claim 7, further comprising:
  receiving by the processor in a search engine interface of the host computing system, a search query; and,
  conducting by the processor the search query against the knowledge graph.

10. The method of claim 8, further comprising defining by the processor a set of key performance indicators (KPIs) in the data store, wherein at least one of the predictive functions determines a change in one of the KPIs based at least one of the newly published ones of the events.

11. The method of claim 7, further comprising persisting by the processor one or more access rules in the data store each rule defining a limitation on accessing state information for the knowledge graph based upon an identity of a corresponding one of the actors seeking access to the knowledge graph.

12. The method of claim 7, wherein the collaboration models include at least one model directed to data sharing requirements for a retail stock optimization, at least one model directed to data sharing requirements for transportation and logistics resource and capacity optimization, at least one model directed to data sharing requirements for logistics pooling and integration for urban distribution, at least one model directed to data sharing requirements for electronic compliance with governmental regulations, and at least one model directed to data sharing requirements for supply chain financial management.

13. A computer program product for ad hoc supply chain collaborative computing the computer program product including a non-transitory computer readable storage medium having program instructions embodied therewith, the program instructions executable by a device to cause the device to perform a method including:
  presenting in a user interface of a host computing system, a list of collaboration models, each corresponding to a different set of data processing requirements in a supply chain and acting as a template for an instance of an ad hoc supply chain collaborative computing environment, each of the collaboration models defining:
   a specific type of knowledge graph comprising different entities representative of corresponding actors and resources of the supply chain necessary to fulfill data sharing requirements of the different set, joined by edges representative of relationships between respectively joined ones of the entities,
   a set of events expected to be received in connection with the data sharing requirements, and
   an initialized instance of a knowledge graph that has been initialized in accordance with the selected collaboration model and persisted in a data store, with corresponding one or more entities which have been updated in response to an applied one of the set of events;
  selecting in the user interface, one of the collaborative models and in response to the selection, initializing in memory of the host computing system in accordance with the selected collaboration model, a knowledge graph comprising different entities representative of corresponding resources of the supply chain, joined by edges representative of relationships between respectively joined ones of the entities;
  registering by a processor of the host computing system different actors in a supply chain as authenticated publishers or subscribers to an event log persisted in the data store coupled to the host computing system and comprising different events defined in accordance with the selected collaboration model and published to the event log by different authenticated computing systems of the actors and mapping events occurring in information systems of respective ones of the actors to the events of the selected collaboration model;

authenticating by the processor different ones of the registered different actors prior the different actors publishing events to the event log;

modifying by the processor different states of the entities of the knowledge graph responsive to a set of newly published ones of the events which have been mapped to functions, each of the functions operating upon data stored in the entities and data stored in the published ones of the events so as to perform an updating of different states of the entities of the knowledge graph; and providing by the processor read-only access to the different states of the entities of the knowledge graph to authenticated subscriber ones of the actors through an interface to a supply chain collaborative computing environment module.

14. The computer program product of claim 13, further comprising transmitting the different states of the entities of the knowledge graph to other supply chain collaborative computing environments in an aggregation of interoperable supply chain collaborative computing environments.

15. The computer program product of claim 13, further comprising:

receiving in a search engine interface of the computer, a search query; and, conducting the search query against the knowledge graph.

16. The computer program product of claim 14, further comprising defining a set of key performance indicators (KPIs) in the data store, wherein at least one of the functions determines a change in one of the KPIs based at least one of the newly published ones of the events.

17. The computer program product of claim 13, further comprising persisting one or more access rules in the data store each rule defining a limitation on accessing state information for the knowledge graph based upon an identity of a corresponding one of the actors seeking access to the knowledge graph.

18. The computer program product of claim 13, wherein the collaboration models include at least one model directed to data sharing requirements for a retail stock optimization, at least one model directed to data sharing requirements for transportation and logistics resource and capacity optimization, at least one model directed to data sharing requirements for logistics pooling and integration for urban distribution, at least one model directed to data sharing requirements for electronic compliance with governmental regulations, and at least one model directed to data sharing requirements for supply chain financial management.

* * * * *